United States Patent
Elgebeely et al.

(10) Patent No.: US 9,690,760 B2
(45) Date of Patent: Jun. 27, 2017

(54) BIDIRECTIONAL HYPERLINK SYNCHRONIZATION FOR MANAGING HYPERTEXTS IN SOCIAL MEDIA AND PUBLIC DATA REPOSITORY

(71) Applicant: International Business Machines Corporation, Armonk, NY (US)

(72) Inventors: Aya R. Elgebeely, 6th of October (EG); Mohamed M. Elsayed, Giza (EG); Su Liu, Round Rock, TX (US); Ashraf G. Sadek, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 14/278,445

(22) Filed: May 15, 2014

(65) Prior Publication Data
US 2015/0331957 A1    Nov. 19, 2015

(51) Int. Cl.
*G06F 17/30*    (2006.01)
*G06F 17/22*    (2006.01)

(52) U.S. Cl.
CPC .... *G06F 17/2235* (2013.01); *G06F 17/30371* (2013.01); *G06F 17/30575* (2013.01); *G06F 17/30864* (2013.01); *G06F 17/30882* (2013.01); *G06F 17/30887* (2013.01)

(58) Field of Classification Search
CPC .................................................. G06F 17/30887
USPC .......................... 707/755, 707–709; 709/201
See application file for complete search history.

(56) References Cited

U.S. PATENT DOCUMENTS

| | | |
|---|---|---|
| 6,591,266 B1 | 7/2003 | Li et al. |
| 7,421,498 B2 | 9/2008 | Packer |
| 7,426,687 B1 | 9/2008 | Schultz et al. |
| 7,610,267 B2 | 10/2009 | Kulkarni et al. |
| 7,689,667 B2 | 3/2010 | Lal |
| 7,818,312 B2 | 10/2010 | Broder et al. |
| 8,135,705 B2 | 3/2012 | Beynon et al. |
| 8,392,576 B1 | 3/2013 | Henderson |
| 2004/0267726 A1 | 12/2004 | Beynon et al. |
| 2005/0021862 A1 | 1/2005 | Schroeder et al. |
| 2006/0212792 A1 | 9/2006 | White et al. |
| 2006/0294052 A1* | 12/2006 | Kulkarni ............. G06F 17/3089 |
| 2008/0263193 A1 | 10/2008 | Chalemin et al. |
| 2011/0153631 A1 | 6/2011 | Kondasani |

(Continued)

OTHER PUBLICATIONS

IBM, "List of IBM Patents or Patent Applications Treated as Related (Appendix P)," Feb. 26, 2015.

(Continued)

*Primary Examiner* — Marc Filipczyk
(74) *Attorney, Agent, or Firm* — Patricia B. Feighan

(57) ABSTRACT

A method for bidirectional hyperlink management of a hypertext associated with an on-line media is provided. The method may include searching the on-line media for at least one keyword associated with the hypertext. The method may also include scanning a website associated with the hypertext based on the search of the at least one keyword. The method may further include locating at least one dead-link uniform resource locator (URL) associated with the scanned website. Additionally, the method may include managing the at least one located dead-link based on a set of pre-defined rules associated with the on-line media.

12 Claims, 4 Drawing Sheets

(56) References Cited

U.S. PATENT DOCUMENTS

| | | | | |
|---|---|---|---|---|
| 2011/0258201 | A1* | 10/2011 | Levow | G06Q 10/107 707/748 |
| 2012/0191716 | A1 | 7/2012 | Omoigui | |
| 2013/0074148 | A1* | 3/2013 | Van Megchelen | G06F 17/30887 707/709 |
| 2013/0173408 | A1 | 7/2013 | Lindblom | |
| 2013/0325919 | A1 | 12/2013 | Carter et al. | |

OTHER PUBLICATIONS

Elgebeely et al., "Bidirectional Hyperlink Synchronization for Managing Hypertexts in Social Media and Public Data Repository," filed Feb. 26, 2015, p. 1-26, U.S. Appl. No. 14/632,060.

Alur et al, "LinkIntegrity+: A Web Asset Integrity Solution," IBM Almaden Research Center, 650 Harry Road, San Jose, CA 95120.

Eisenberg, "For Missing Web Pages, a Department of Lost and Found," The New York Times, Oct. 21, 2004, p. 1-2, http://www.nytimes.com/2004/10/21/technology/circuits/21next.html?_&_r=0, Accessed on Mar. 3, 2014.

Harrison, "Opal: In Vivo Based Preservation Framework for Locating Lost Web Pages," Aug. 2005, p. 1-84, Thesis, Old Dominion University.

Pitkow et al, "Supporting the Web: A Distributed Hyperlink Database System," Fifth International World Wide Web Conference, May 6-11, 1996, p. 1-10, GVU Technnical Report: GIT-GVU-96-09, Paris, France.

Rhodes, "Breaking Down Link Rot: The Chesapeake Project Legal Information Archive's Examination of URL Stability," Law Library Journal, 2010, p. 581-597, vol. 102:4 [2010-33].

Singh, "Text Analytics: Multilingual Dynamic Ontology Creation Using Wikipedia," Internationalization & Unicode Conference, Oct. 23, 2013, p. 1, Session 12, Santa Clara, CA, USA, http://www.unicodeconference.org/program-d.htm#S12-1, Accessed on Apr. 10, 2014.

Slashdot, "Broken Links No More?," Sep. 24, 2004, Posted by Michael from the dream-big dept., Dice Holdings Inc, http://slashdot.org/story/04/09/24/1226250/broken-links-no-more.

Twist, "Web tool may banish broken links," BBC News, Sep. 24, 2004, p. 1-2, http://news.bbc.co.uk/2/hi/technology/3666660.stm, Accessed on Mar. 3, 2014.

Wikipedia, "Broken redirects," p. 1-6, Wikipedia: the Free Encyclopedia, http://en.wikipedia.org/w/index.php?title=Special:BrokenRedirects&limi, Accessed on Apr. 10, 2014.

Wikipedia, "Date format by country," p. 1-12, Wikipedia: the Free Encyclopedia, http://en.wikipedia.org/wiki/Date_format_by_country, Accessed on Mar. 3, 2014.

Wikipedia, "Hyperlink," p. 1-7, Wikipedia: the Free Encyclopedia, http://en.wikipedia.org/wiki/Hyperlink, Accessed on Mar. 3, 2014.

Wikipedia, "IBM Peridot (software)," p. 1, Wikipedia: the Free Encyclopedia, http://en.wikipedia.org/wiki/IBM_Peridot_(software), Accessed on Mar. 3, 2014.

Wikipedia, "Internet," p. 1-23, Wikipedia: the Free Encyclopedia, http://en.wikipedia.org/wiki/Internet, Accessed on Mar. 3, 2014.

Wikipedia, "Wikipedia:Link rot," p. 1-9, Wikipedia: the Free Encyclopedia, http://en.wikipedia.org/wiki/Wikipedia: Linkrot, Accessed on Mar. 3, 2014.

Wikipedia, "Server (computing)," p. 1-7, Wikipedia: the Free Encyclopedia, http://en.wikipedia.org/wiki/Server_(computing), Accessed on Mar. 3, 2014.

Wikipedia, "Help:Using the Wayback Machine," p. 1-5, Wikipedia: the Free Encyclopedia, http://en.wikipedia.org/wiki/Wikipedia:Using_the_Wayback_Machine, Accessed on Mar. 3, 2014.

Wikipedia, "Web page," p. 1-6, Wikipedia: the Free Encyclopedia, http://en.wikipedia.org/wiki/Web_page, Accessed on Mar. 3, 2014.

Wikipedia, "Web search engine," p. 1-9, Wikipedia: the Free Encyclopedia, http://en.wikipedia.org/wiki/Search_engine, Accessed on Mar. 3, 2014.

Wikipedia, "Website," p. 1-10, Wikipedia: the Free Encyclopedia, http://en.wikipedia.org/wiki/Website, Accessed on Mar. 3, 2014.

* cited by examiner

BIDIRECTIONAL HYPERLINK SYNCHRONIZATION FOR MANAGING HYPERTEXTS IN SOCIAL MEDIA AND PUBLIC DATA REPOSITORY

FIELD OF THE INVENTION

The present invention relates generally to the field of computing, and more particularly to social media and public data repositories.

BACKGROUND

A uniform resource locator (URL) is a reference of a web address for locating an internet resource. In most document formats (such as HTML, excel, doc, and PDF), URLs may be embedded as hyperlinks which point to cited documents stored in local or remote hosts for easy access and reference. Hypertext is text with hyperlinks. In public data repositories and in social media, embedded hyperlinks may reference important information and are often used to implement reference mechanisms, such as tables of contents, footnotes, bibliographies, indexes, letters, and glossaries.

SUMMARY

According to one embodiment, a method for bidirectional hyperlink management of a hypertext associated with an on-line media is provided. The method may include searching the on-line media for at least one keyword associated with the hypertext. The method may also include scanning a website associated with the hypertext based on the search of the at least one keyword. The method may further include locating at least one dead-link uniform resource locator (URL) associated with the scanned website. Additionally, the method may include managing the at least one located dead-link based on a set of pre-defined rules associated with the on-line media.

According to another embodiment, a computer system for bidirectional hyperlink management of a hypertext associated with an on-line media is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include searching, by a hyperlink management daemon, the on-line media for at least one keyword associated with the hypertext. The method may also include scanning, by the hyperlink management daemon, a website associated with the hypertext based on the search of the at least one keyword. The method may further include locating, by the hyperlink management daemon, at least one dead-link uniform resource locator (URL) associated with the scanned website. Additionally, the method may include managing, by the hyperlink management daemon, the at least one located dead-link based on a set of pre-defined rules associated with the on-line media.

According to yet another embodiment, a computer program product for bidirectional hyperlink management of a hypertext associated with an on-line media is provided. The computer program product may include one or more computer-readable tangible storage medium and program instructions stored on at least one of the one or more tangible storage medium, the program instructions executable by a processor. The computer program product may include program instructions to search the on-line media for at least one keyword associated with the hypertext. The computer program product may also include program instructions to scan a website associated with the hypertext based on the search of the at least one keyword. The computer program product may further include program instructions to locate at least one dead-link uniform resource locator (URL) associated with the scanned website. Additionally, the computer program product may include program instructions to manage the at least one located dead-link based on a set of pre-defined rules associated with the on-line media.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
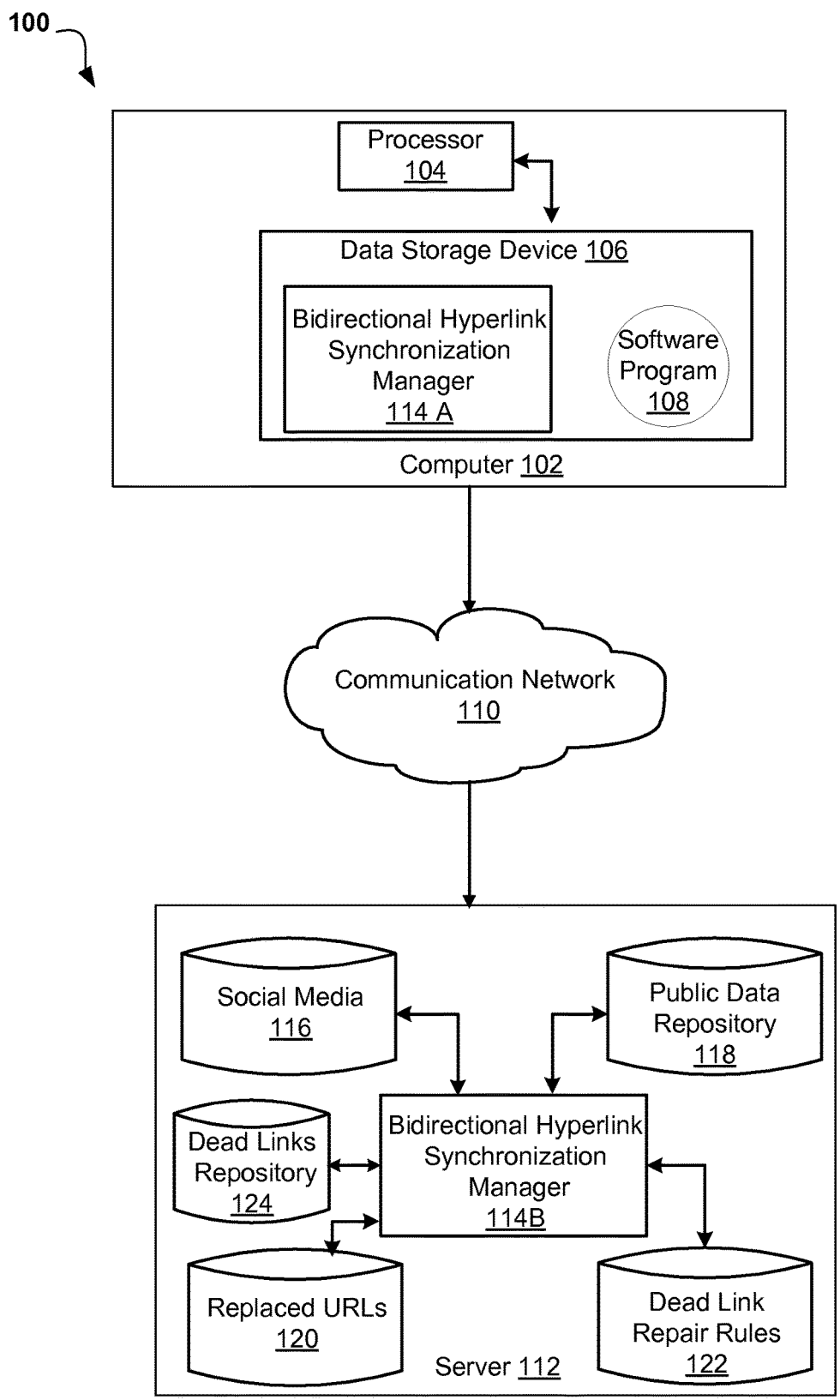
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to social media and public data repositories. The following described exemplary embodiments provide a system, method and program product to, among other things, manage hypertexts in online-media (i.e., social media and public data repositories).

As previously described with respect to most document formats URLs may be embedded as hyperlinks which point to cited documents stored in local or remote hosts for easy access and reference. In public data repositories and in social media, embedded hyperlinks may reference important information and are often used to implement reference mechanisms. However, the embedded hyperlink URL objects in the social media or public data repository may be renamed or removed by owner in targeted servers without any notification. For example, if a URL's content has been changed either in a server name or file name, then all related hyperlinks embedded in a document may not be accessible and as such may become a dead-link. Therefore, it may be advantageous, among other things, to provide a real-time prototype for replacing inaccessible hypertexts in social media and public data repositories in addition to dynamically managing the dead-links in a bidirectional manner, on both sides (from a hypertext service to hyperlinks, and from hyperlinks to hypertext), with respect to social media and public data repositories.

According to at least one embodiment, a bidirectional dead-link repair concept and an implementation protocol may be defined for validating, replacing, redirecting, synchronizing and managing hyperlinks of public data. The public data may include any social media and public repositories such as, Facebook® (Facebook and all Facebook-based trademarks and logos are trademarks or registered trademarks of Facebook and/or its affiliates), Twitter® (Twitter and all Twitter-based trademarks and logos are trademarks or registered trademarks of Twitter and/or its affiliates) or, Wikipedia® (Wikipedia and all Wikipedia-based trademarks and logos are trademarks or registered trademarks of Wikimedia and/or its affiliates). The bidirectional hyperlink synchronization may include managing the dead-links from hypertext service to hyperlinks, and from hyperlinks to hypertext. The present embodiment may also include a hyperlink management daemon; a real-time URL replacement framework; a dead-link detection algorithm; real-time URL replacement and redirection algorithms; and a set of predefined rules of URL replacement and redirection. Based on the set of predefined rules of URL replacement and redirection, the hyperlink management daemon may be able to dynamically find dead-links and replace changed URLs in the documents saved in social media.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to manage hypertexts in social media and public data repositories. According to one implementation of the present embodiment, a bidirectional dead-link tracking concept may be introduced as well as a bidirectional dead-link implementation protocol and a real-time dead-link replacement method.

As previously described, the present embodiment may include a bidirectional hyperlink synchronization manager. Components and algorithms of the bidirectional hyperlink synchronization manger may include a hyperlink management daemon; a real-time URL replacement framework (i.e., engine); a dead-link detection algorithm; real-time URL replacement and redirection algorithms; and a set of predefined rules of URL replacement and redirection. The components and algorithms associated with the bidirectional hyperlink synchronization manager will be discussed in further detail with respect to FIG. 2. Based on the set of predefined rules of URL replacement and redirection, the hyperlink management daemon (i.e., the hypertext search daemon) may be able to dynamically find dead-links and replace changed URLs in the documents saved in social media. According to at least one implementation of the present embodiment, the hypertext search daemon may be enabled to search hypertext in public media by using certain hyperlink keywords and a public media list. Additionally, the hypertext search daemon may allocate all related web pages, scan the allocated web pages, and extract and list all keyword-related hyperlink/URL links. The hypertext search daemon may also save and/or update the related hyperlink list.

The URL validation and dead-link detection engine may validate each listed URL in the hyperlink list and update the status of the URL link (i.e., alive-link or dead-link). As such, according to at least one implementation, the scope of the URLs may be predefined. For example, the scope of the URLs may include only URLs associated with a particular on-line media, such as an on-line encyclopedia site or a particular linked URL, such as IBM URLs listed in a particular on-line media. Additionally, according to one implementation, the validation may include a check to determine whether the listed URL object link is under the predefined scope. For example, an IBM user may only be interested in URLs under IBM's domain. Furthermore, the present embodiment may periodically check if the listed URL is available using existing technology. If a checked URL is unavailable for a length of time that exceeds a configurable threshold, then the URL link may be marked as dead-link.

The dead-link replacement wizard may re-check the status of the URL link to determine if each listed URL link is still alive. If the listed URL link is not alive, then the present embodiment may add the URL to the dead-links database (i.e., repository or list) and begin a dead-link replacement service to determine if there is a corrected replacement URL for the current dead-link. If there is a corrected replacement URL for the current dead-link, then the URL may be replaced. However, if there is not a corrected replacement URL for the current dead-link, then the present embodiment may assign correlated default pages (i.e., a set of categorized pages) and replace the URL.

Referring now to FIG. 1, an exemplary networked computer environment 100 in accordance with one embodiment is depicted. The networked computer environment 100 may include a computer 102 with a processor 104 and a data storage device 106 that is enabled to run a software program 108 and a bidirectional hyperlink synchronization manager 114A. The networked computer environment 100 may also include a social media 116, a public data repository 118, a replaced URLs database 120, a dead-link repair rules database 122, a dead-links repository (i.e., dead-links database or dead-links list) 124, a server 112 running a bidirectional hyperlink synchronization manager 114B and a communication network 110. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with social media 116 running on server computer 112 or public data repository 118 running on server computer 112 via the communications network 110. The communications network 110 may include connections, such as wire, wireless communication links, or fiber optic cables. As will be discussed with reference to FIG. 4, server computer 112 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of accessing a network and capable of accessing a social media 116 or a public data repository 118.

As previously described, the client computer 102 may access social media 116, running on server computer 112 or public data repository 118, running on server computer 112 via the communications network 110. For example, a user using a software program 108 (e.g., Firefox®) (Firefox and all Firefox-based trademarks and logos are trademarks or registered trademarks of Mozilla and/or its affiliates) running on a client computer 102 may connect via a communication network 110 to social media network 116, which may be running on server computer 112 or public data repository 118 which may be running on server computer 112. According to at least one implementation of the present embodiment, the bidirectional hyperlink synchronization manager 114B may be centralized on a server 112, and also it may be divided between two different components: server-side and client-side. The server-side of bidirectional hyperlink synchronization manager 114B running on server computer 112 may interact with a web browser and online media. The client-side bidirectional hyperlink synchronization manager 114A client may be installed as a plug-in to a web browser (e.g., Firefox®) (Firefox and all Firefox-based trademarks and logos are trademarks or registered trademarks of Mozilla and/or its affiliates), or as a program installed on the user's computer 102.

Figure 2:
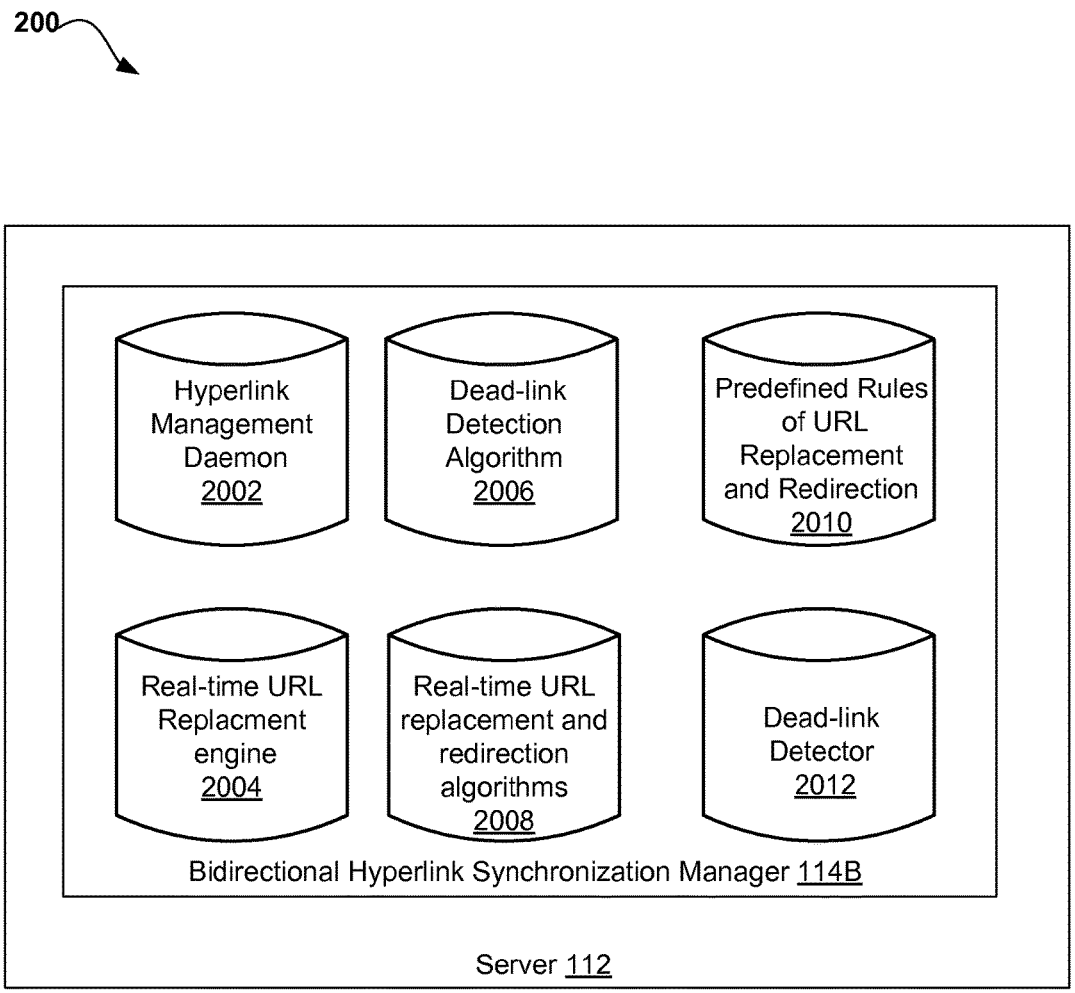
FIG. 2 illustrates the components and algorithms associated with the bidirectional hyperlink synchronization manager according to at least one embodiment.

Referring now to FIG. 2, the components and algorithms associated with the bidirectional hyperlink synchronization manager 200 in accordance with one embodiment is depicted. The bidirectional hyperlink synchronization manager 114B, running on server computer 112 may include a hyperlink management daemon 2002; a real-time URL replacement engine 2004; a dead-link detector 2012 and related detection algorithm 2006; real-time URL replacement and redirection algorithms 2008; and a set of predefined rules of URL replacement and redirection 2010. The hyperlink management daemon 2002 may be implemented as a backend application to connect related synchronization components and implement dead-link update management. The set of predefined rules of URL replacement and redirection 2010 includes all configurable settings (scope of URL being monitored, replaced, etc.) and criteria (definition of a dead-link, depth of URL link search and replacement, etc) used by the bidirectional hyperlink synchronization manager 114B. For example, a user may only focus on certain domain URLs and ignore other URL links. The dead-link detection algorithm 2006 may be used by the bidirectional hyperlink synchronization manager 114B for monitoring and scanning certain domain and URLs on the domains, and for checking availability of hyperlinked objects. Additionally, the dead-link detection algorithm 2006 may update the dead-links list (i.e., repository or database) 124 (FIG. 1), periodically. The real-time URL replacement engine 2004 may be a standalone application or integrated into the hyperlink management daemon 2002. It may login to online media and replace dead-links with recommended URL links based on the real-time URL replacement and redirection algorithms 2008. Based on the set of predefined rules of URL replacement and redirection, bidirectional hyperlink synchronization manager 114B (FIG. 1) may be able to dynamically find dead-links and replace changed URLs in the documents saved in social media 116 (FIG. 1) or a public data repository 118 (FIG. 1). The method associated with the bidirectional hyperlink synchronization manager 114A, 114B (FIG. 1) is explained in further detail below with respect to FIG. 2.

Figure 3:
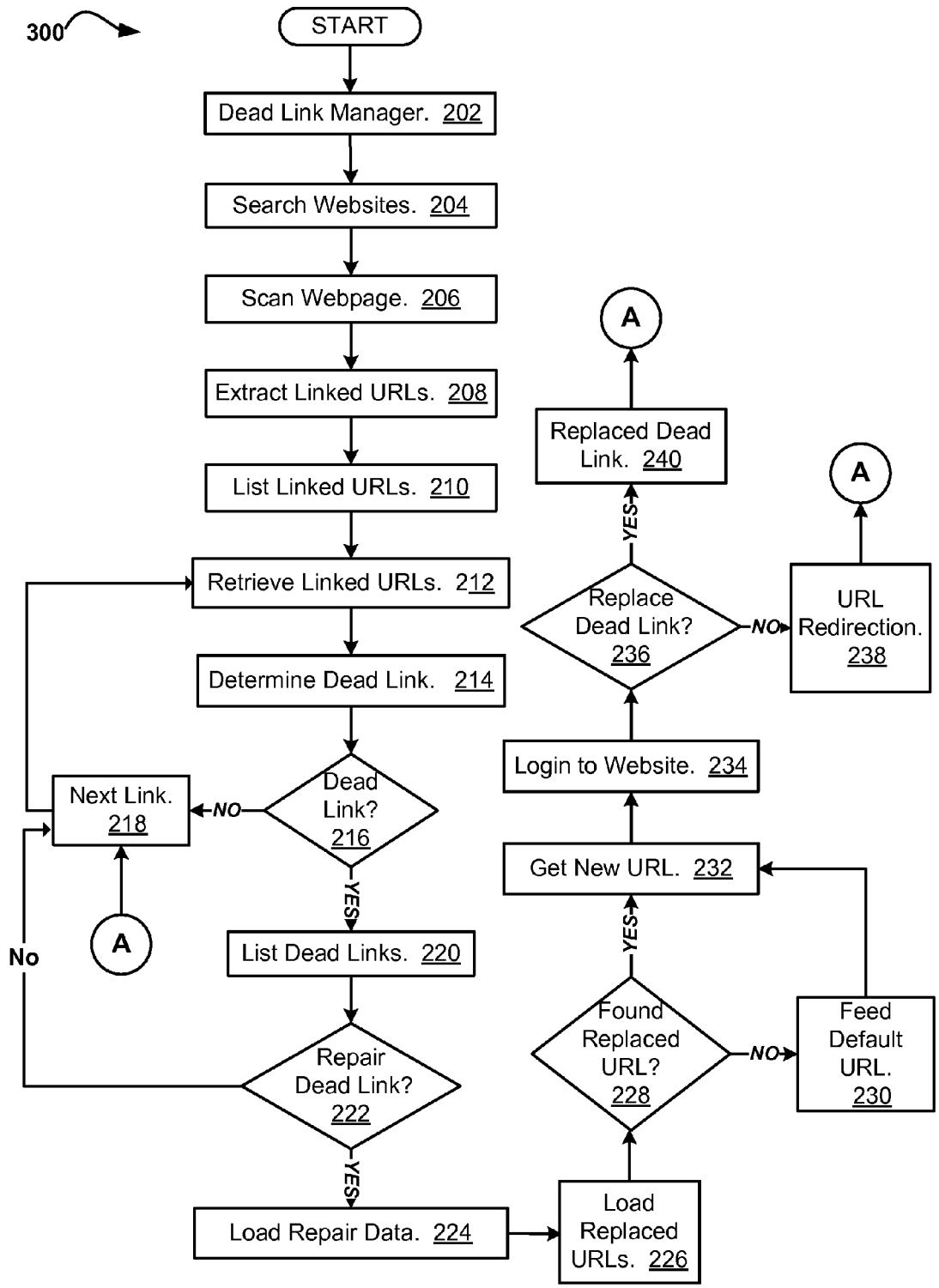
FIG. 3 is an operational flowchart illustrating the steps carried out by a program to manage hypertexts in social media and public data repositories according to at least one embodiment.

FIG. 3, an operational flowchart 300 illustrating the steps carried out by a program to manage hypertexts in social media and public data repositories in accordance with one embodiment is depicted. At 202, the dead-link manager (i.e., agent or daemon running on server 112 FIG. 1) aspect of the bidirectional hyperlink synchronization manager 114B (FIG. 1) may be started. According to the present embodiment, the dead-link manager may be able to dynamically find dead-links and replace changed URLs in the documents saved in social media, public data repositories or any URLs and domains in which the hyperlink management daemon 2002 (FIG. 2) may have write access to on the target URL host. For example, the hyperlink management daemon 2002 (FIG. 2) may have write access since the hyperlink management daemon 2002 (FIG. 2) may need to update and save updated web documents to the URL document host. However, according to the present embodiment, the URL redirection service 2008 (FIG. 2) technology may be applicable to the internet as a whole.

For example, with respect to an information center website that provides thousands of documents, the dead-link manager may be able to dynamically search, monitor, and manage dead-links associated with URLs for the documents contained in the information center website. According to at least one implementation, the dead-link detection algorithm 2006 (FIG. 2) may include how to find a dead-link by utilizing existing technology for dead-link detection. For example, the "No URL exist error 404" detection is a typical method to detect dead-links. However, the error "404" may not always be equal to a dead-link (e.g., a server may not be operating properly). Therefore, the present embodiment may measure the length of time that the URL has been unavailable. As such, the dead-link manager (i.e., detector) 2012 (FIG. 2) along with the dead-link detection algorithms 2006 (FIG. 2) may monitor and scan certain domains and URLs on the domains that have been listed on a dead-links list (i.e., repository or database) 124 (FIG. 1), check availability of hyperlinked objects, and then update the dead-links list (i.e., repository or database) 124 (FIG. 1), periodically.

Next, at 204, websites are searched. As such, an on-line public data repository (i.e., on-line media) may be searched for at least one keyword associated with the hypertext. For example, according to at least one implementation of the present embodiment, a hypertext search daemon (i.e., hyperlink management daemon 2002 (FIG. 2)) aspect of the bidirectional hyperlink synchronization manager 114B (FIG. 1) may be enabled to search hypertext in public media (i.e., on-line public data repository or on-line media, such as Facebook® (Facebook and all Facebook-based trademarks and logos are trademarks or registered trademarks of Facebook and/or its affiliates)) by using certain hyperlink keywords (e.g., "ibm.com").

Then at 206, webpages may be scanned. Therefore, the hypertext search daemon may allocate all web pages and scan the allocated web pages. As such, a website associated with the hypertext may be scanned based on the search of the at least one keyword, such as "ibm.com" with respect to the previous example.

Next, at 208, linked URLs may be extracted. Therefore, all keyword-related hyperlink and URL links may be extracted from linked sites that have been scanned. As such, with respect to the previous example, all related hyperlinks ad URLs with the key word "ibm.com" may be extracted from the scanned linked sites.

Then at 210 linked URLs may be listed. Therefore, the number of URLs that will be monitored may be determined and all keyword-related hyperlink and URL links may be saved or updated on a related-hyperlink list. For example, the hyperlinks that have been extracted in the previous step may be identified as worthy of tracking and may be listed in a linked URL list stored in a repository.

Next at 212, the linked URLs may be retrieved. For example, all keyword-related hyperlink and URL links that are on the related-hyperlink list may be retrieved. Then at 214, a dead-link may be determined. Therefore, the bidirectional hyperlink synchronization manager 114B (FIG. 1) may locate at least one dead-link uniform resource locator (URL) associated with the previously scanned website.

Next at 216, it is determined as to whether a dead-link is detected. As such, the status of the URL link may be re-checked to determine if each listed URL link is still alive. As such, the validation and dead-link detection engine aspect of the bidirectional hyperlink synchronization manager 114B (FIG. 1) may be enabled to validate each listed URL in the hyperlink list and then update the status of the URL link as an alive-link or a dead-link.

If at 216, it is determined that a dead-link is not detected then the next link may be examined at 218 and the URLs associated with that link may be retrieved at 212. Then the process may continue to step 214 as previously described. However, if at 216, it is determined that a dead-link is detected then at 220 the dead-link may be added to a dead-links repository 124 (FIG. 1) (i.e., a dead-links list or a dead-links database or repository 124 (FIG. 1)). As such, a URL associated with an encountered dead-link may be marked as a dead-link URL and may be added to a list of dead-links contained in a dead-links repository. Therefore, a dead-links list (i.e., repository or database) 124 (FIG. 1) may be generated that includes hypertext information. For example, the hypertext information may include a social media server, a hypertext document name, a linked object server and a linked object name, or keywords, etc.

Next at 222, it is determined whether the dead-link should be repaired. As such, the dead-link replacement service aspect of the bidirectional hyperlink synchronization manager 114B (FIG. 1) may be enabled to analyze a dead-link, categorize the dead-link, and manage the dead-link based on a set of pre-defined rules associated with the on-line public data repository (i.e., on-line media). For example, the dead-link may be categorized as renamed, removed, location changed, etc. Additionally, the bidirectional hyperlink synchronization manager 114B (FIG. 1) may locate a replacing linked object based on the dead-link categorization. The bidirectional hyperlink synchronization manager 114B (FIG. 1) may also replace the dead-link in the media repository based on a set of pre-defined rules. According to at least one embodiment, dead-link replacement rules may be created as well as an alternate replacement list for renamed, removed, and location changed linked-objects. Additionally, the present embodiment may include creating accounts in related social media servers with right access privilege.

If at 222 it is determined that a dead-link should not be repaired, then the method may continue back to step 218 as previously described. According to one implementation, a dead-link may be encountered, but not fixed if dead-link repairs were determined to be performed at a later time. For example, repairs associated with dead-links contained in the dead-links repository may be performed during off-peak hours when network traffic may be less.

However, if at 222 it is determined that a dead-link should be repaired, then at 224 the repair data may be loaded from a set of pre-defined repair rules. As such, definitions (i.e., repair data) associated with determining how to repair a dead-link may be loaded. According to at least one implementation, the repair data definitions may include information such as whether the URL link is permanently broken or temporarily broken. The repair data definitions may also include whether a temporary or permanent fix (i.e., repair) may be applied. For example, the repair data may include information, such as that a document owner should be informed of the dead-link URL; that the document has been permanently removed, or that the document has been replaced by a different URL. According to at least one implementation, the determination as to whether a dead-link should be repaired may include determining how long the URL link has been dead (e.g., repair definitions may state that any link that has been dead for more than 30 minutes should be repaired); determining if the URL link is temporarily not working or permanently not working; and what the repair data may suggest in terms of repairing the dead-link (e.g., the server where the URL link is located was temporarily not in service). As such, for a temporarily broken (i.e., dead) link, a temporary solution may be needed. Similarly, for a permanently broken (i.e., dead) link, a permanent solution may be needed.

Then at 226, the replaced URLs are loaded. For example, the present embodiment may utilize existing technology to access a replaced URL repository 120 (FIG. 1) or the list of the dead-link URL (as previously described with respect to step 222). The replaced URL repository 120 (FIG. 1) may be created and maintained based on existing technologies (such as document owner reports for any changes, document update logs, documents with same fingerprint, document clustering analysis, etc. . . . ). The replaced URL repository 120 (FIG. 1) and the list of the dead-link URL may keep track of URLs that have been replaced and where the dead-link URLs have been redirected. Then at 228, it is determined whether a replaced URL has been found in the replaced URLs repository. If it is determined that a replaced URL has been found in the replaced URLs repository then at 232, a new URL may be obtained. For example, the dead-link URL may be replaced by a corrected replacement URL. However, if at 228, it is determined that a replaced URL has not been found in the replaced URLs repository, then at 230, the default URL may be obtained. For example, existing technology may be utilized to find a related or similar document to be used as a default URL. Next, at 232, the new URL is obtained. For example, the dead-link URL may be replaced by a corrected replacement URL or by assigning correlated default pages (i.e., a set of categorized pages that are similar to the dead-link URL).

Next at 234, the website associated with the social media or public data repository may be accessed (i.e., the bidirectional hyperlink synchronization manager 114B (FIG. 1) may login to a website associated with the social media or public data repository) to change the dead-link. Then at 236 it is determined whether the dead-link should be replaced. If at 236, it is determined that the dead-link should not be replaced, then at 238 the URL link is redirected (bidirectional from either the object set or the web server side) based on the new URL obtained in step 232. As such, the bidirectional algorithm may manage the dead-links in two different directions from a hypertext service to hyperlinks (i.e., links in documents to linked objects in step 240), and from hyperlinks to hypertext (i.e., linked objects to links in documents in step 238). Then the method may continue to step 218 as previously described. However, if at 236, it is determined that the dead-link should be replaced, then at 240 the dead-link is replaced and the method may continue to step 218 as previously described.

It may be appreciated that FIG. 3 provides only an illustration of one implementation and does not imply any limitations with regard to how different embodiments may be implemented. Many modifications to the depicted environments may be made based on design and implementation requirements. For example, according to at least one implementation of the present embodiment, there may be server side URL management rules. The server side management rules may include URL naming policies; URL recycling policies; URL name modifying rules; URL name compliance verification (i.e., URL name check); and URL name management. The URL name management many include a changing risk analysis. The changing risk analysis may reject or approve a request based on the following factors: the number of citations (i.e., according to a list); the number of links in external media (i.e., hypertext link lists); and a daily access rating. The changing risk analysis may also generate a replacement mapping table (i.e., old URL: new URL). Furthermore, the URL management rules may publish URL changes; replace a changed URL in related public pages; and enable redirection service.

Additionally, according to at least one implementation, a replace service configuration application may also be included in the present embodiment. The replace service configuration application may include public media account management and bidirectional repair of a dead-link. The public media account management may include configuring the public media account for automated updates; authentication rules; user's account management; update restrictions; dead-link notification rules; and a hypertext modification agreement. The bidirectional repair of a dead-link may include, restoring a changed page for a linked URL server and redirecting a URL for a linked URL server. As previously described, the bidirectional algorithm may manage the dead-links in two different directions from a hypertext service to hyperlinks (i.e., links in documents to linked objects), and from hyperlinks to hypertext (i.e., linked objects to links in documents). The bidirectional repair of a dead-link may also include replacing a dead-link with the redirect URL address in a social media server or a public data repository server; replacing a dead-link with the new URL address which has the same or similar contents in a social media server or a public data repository server; and replacing a dead-link with default categorized pages in a social media server or a public data repository server.

Furthermore, according to one implementation of the present embodiment, the bidirectional hyperlink synchronization manager 114B (FIG. 1) may monitor an interested hypertext document in certain social media for updating an invalid linked object. Additionally, the bidirectional hyperlink synchronization manager 114B (FIG. 1) may be responsive to detecting a change in a hyperlinked object server and automatically update the renamed or removed location changed information in the listed hyperlinks.

Figure 4:
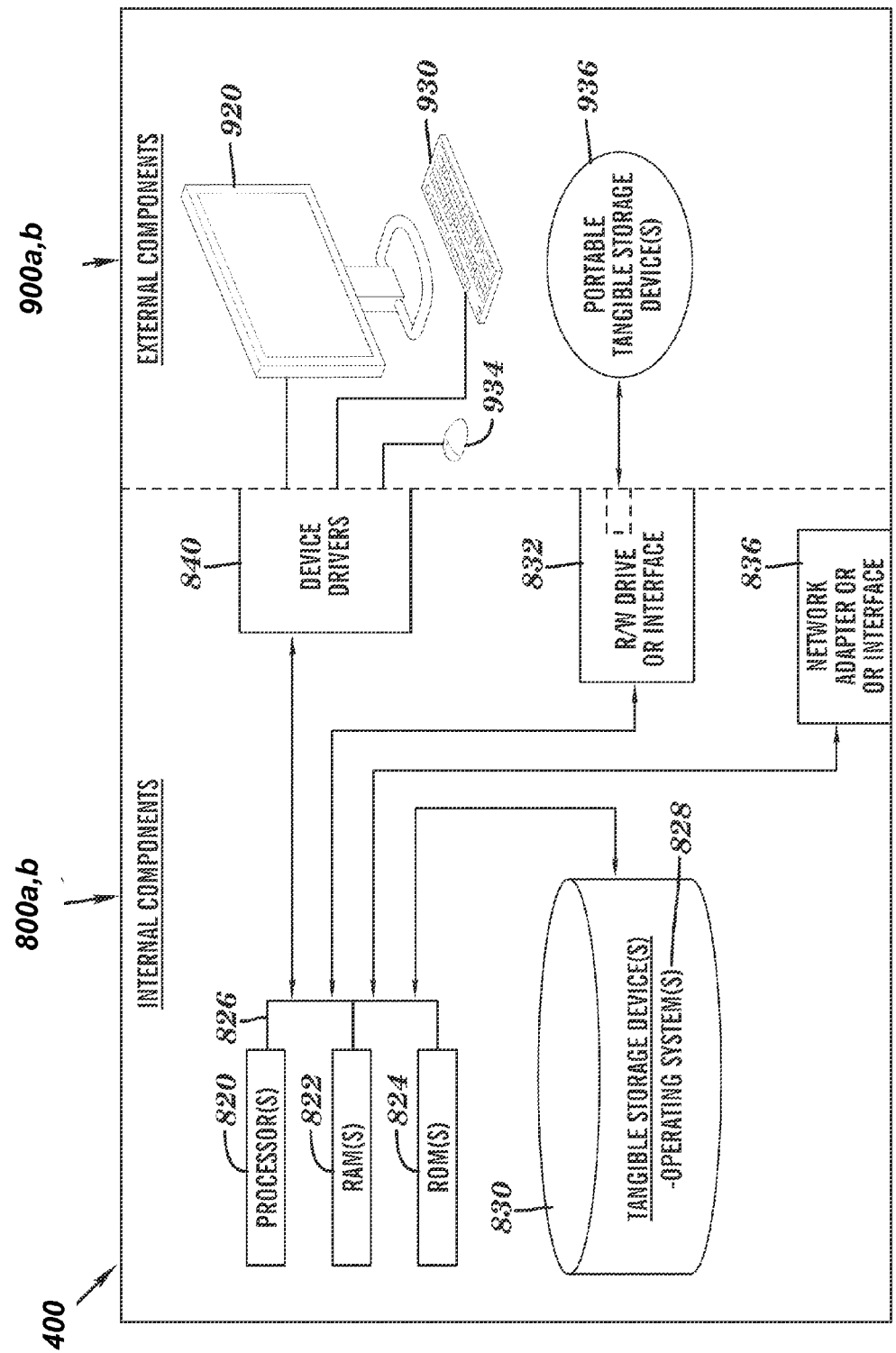
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800a, b and external components 900a, b illustrated in FIG. 4. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software programs 108 (FIG. 1) in client computer 102 (FIG. 1) is stored on one or more of the respective computer-readable tangible storage medium 830 for execution by one or more of the respective processors 820 via one or more of the respective RAMs 822 (which typically include cache memory). In the embodiment illustrated in FIG. 4, each of the computer-readable tangible storage medium 830 is a magnetic disk storage device of an internal hard drive. Alternatively, each of the computer-readable tangible storage medium 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage medium 936 such as a CD-ROM, DVD, memory stick, magnetic tape, magnetic disk, optical disk or semiconductor storage device. A software program 108 (FIG. 1), such as bidirectional hyperlink synchronization manager 114A (FIG. 1) or Firefox® (Firefox and all Firefox-based trademarks and logos are trademarks or registered trademarks of Mozilla and/or its affiliates) can be stored on one or more of the respective portable computer-readable tangible storage medium 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The software program 108 (FIG. 1) and bidirectional hyperlink synchronization manager 114A (FIG. 1) in client computer 102 (FIG. 1) and bidirectional hyperlink synchronization manager 114B (FIG. 1) can be downloaded to client computer 102 (FIG. 1) and server computer 112 (FIG. 1), respectively from an external computer via a network (for example, the Internet, a local area network or other, wide area network) and respective network adapters or interfaces 836. From the network adapters or interfaces 836, the code software programs 108 (FIG. 1) in client computer 102 (FIG. 1) and in server computer 112 (FIG. 1) are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for bidirectional hyperlink management of a hypertext associated with an on-line media, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   searching, by a hyperlink management daemon, the on-line media for at least one keyword associated with the hypertext, wherein the searching comprises searching at least one on-line data repository for at least one keyword associated with the hypertext;
   scanning, by the hyperlink management daemon, a website associated with the hypertext based on the search of the at least one keyword;
   locating, by the hyperlink management daemon, at least one dead-link uniform resource locator (URL) associated with the scanned website, wherein locating the at least one dead-link uniform resource locator (URL) comprises testing and validating each uniform resource locator (URL) associated with the scanned website;
   managing, by the hyperlink management daemon, the at least one located dead-link based on a set of pre-defined rules associated with the on-line media, wherein managing the at least one located dead-link comprises replacing or repairing the at least one dead-link based on the set of pre-defined rules and a plurality of repair data definitions, wherein the set of pre-defined rules comprises categorizing the at least one located dead-link as being at least one of renamed, removed, or having a location changed and wherein the plurality of repair data definitions comprises a plurality of instructions for redirecting the at least one located dead-link, wherein the plurality of instructions are created and maintained in a replaced URL repository;
   in response to categorizing the at least one located dead-link as being renamed, removed, or having a location changed, accessing the replaced URL repository and redirecting the at least one located dead-link to an alternate link listed in the replaced URL repository; and
   sending an online status communication to a document owner associated with the managed at least one located dead-link based on the replacing or repairing of the managed at least one located dead-link, wherein the online status communication contains details regarding the categorizing of the at least one located dead-link and the redirecting of the at least one located dead-link to the alternate link.

2. The computer system of claim 1, further comprising:
   validating a status of the at least one located dead-link; and
   updating the status of the at least one located dead-link in a dead-links repository.

3. The computer system of claim 2, wherein updating the status comprises storing whether the at least one located dead-link has a status of dead or alive listed in a dead-links repository.

4. The computer system of claim 1, wherein managing the at least one located dead-link comprises determining whether the dead-link should be repaired based on the set of pre-defined rules.

5. The computer system of claim 4, wherein repairing the at least one located dead-link comprises replacing the dead-link with at least one of a corrected URL and a default page.

6. The computer system of claim 4, wherein determining whether the dead-link should be repaired comprises loading repair data from the set of pre-defined repair rules.

7. The computer system of claim 1, wherein managing the at least one located dead-link comprises a bidirectional redirection of a uniform resource locator (URL) link from either an object set or a webserver side.

8. The computer system of claim 1, wherein the managing the at least one located dead-link comprises determining a replaced uniform resource locator (URL) is found in a URLs repository.

9. A computer program product for bidirectional hyperlink management of a hypertext associated with an on-line media, the computer program product comprising:
   one or more computer-readable tangible storage medium and program instructions stored on at least one of the one or more tangible storage medium, the program instructions executable by a processor, the program instructions comprising:
   program instructions to search the on-line media for at least one keyword associated with the hypertext, wherein the searching comprises searching at least one on-line data repository for at least one keyword associated with the hypertext;
   program instructions to scan a website associated with the hypertext based on the search of the at least one keyword;
   program instructions to locate at least one dead-link uniform resource locator (URL) associated with the scanned website, wherein locating the at least one dead-link uniform resource locator (URL) comprises testing and validating each;
   program instructions to manage the at least one located dead-link based on a set of pre-defined rules associated with the on-line media, wherein managing the at least one located dead-link comprises replacing or repairing the at least one dead-link based on the set of pre-defined rules and a plurality of repair data definitions, wherein the set of pre-defined rules comprises categorizing the at least one located dead-link as being at least one of renamed, removed, or having a location changed and wherein the plurality of repair data definitions comprises a plurality of instructions for redirecting the at least one located dead-link, wherein the plurality of instructions are created and maintained in a replaced URL repository;
   in response to categorizing the at least one located dead-link as being renamed, removed, or having a location changed, program instructions to access the replaced URL repository and redirecting the at least one located dead-link to an alternate link listed in the replaced URL repository; and program instructions to send an online status communication to a document owner associated with the managed at least one located dead-link based on the replacing or repairing of the managed at least one located dead-link, wherein the online status communication contains details regarding the categorizing of the at least one located dead-link and the redirecting of the at least one located dead-link to the alternate link.

10. The computer program product of claim 9, further comprising:

validating a status of the at least one located dead-link; and updating the status of the at least one located dead-link in a dead-links repository.

11. The computer program product of claim 10, wherein updating the status comprises storing whether the at least one located dead-link has a status of dead or alive listed in a dead-links repository.

12. The computer program product of claim 9, wherein managing the at least one located dead-link comprises determining whether the dead-link should be repaired based on the set of pre-defined rules.

* * * * *